United States Patent [19]
Miyama et al.

[11] Patent Number: 4,903,526
[45] Date of Patent: Feb. 27, 1990

[54] TROUBLE DETECTOR SYSTEM FOR AN INTAKE SYSTEM OF AN AUTOMOTIVE ENGINE

[75] Inventors: Shuji Miyama; Hiroya Ohkumo, both of Tokyo, Japan

[73] Assignee: Fuji Jukogyo Kabushiki Kaisha, Tokyo, Japan

[21] Appl. No.: 310,068

[22] Filed: Feb. 9, 1989

[30] Foreign Application Priority Data

Feb. 16, 1988 [JP] Japan ................................. 63-033193

[51] Int. Cl.$^4$ ............................................ G01M 15/00
[52] U.S. Cl. .................................................. 73/117.3
[58] Field of Search ............................ 73/117.3, 118.1; 123/339; 364/431.01

[56] References Cited

U.S. PATENT DOCUMENTS 4,402,217 9/1983 Higashiyama ...................... 73/117.3
4,787,351 11/1988 Sakamoto et al. ..................... 123/339

FOREIGN PATENT DOCUMENTS 58-214632 12/1983 Japan .

Primary Examiner—Jerry W. Myracle
Attorney, Agent, or Firm—Martin A. Farber

[57] ABSTRACT

An automotive engine has a bypass around a throttle valve and at least one valve provided in the bypass. A plurality of reference pressures for pressures in an intake passage of the engine are stored in a memory so as to be derived in accordance with speed of the engine and opening degree of a throttle valve of the engine. Opening degree detected by a throttle position sensor is corrected with opening degree of the valve in the bypass to produce a corrected opening degree. A reference pressure is derived from the memory in accordance with the engine speed and the corrected opening degree. Pressure in an intake pipe is compared with the reference pressure derived from the memory. An abnormality signal is generated when the intake pipe pressure is higher than the reference pressure.

2 Claims, 4 Drawing Sheets

4,903,526

TROUBLE DETECTOR SYSTEM FOR AN INTAKE SYSTEM OF AN AUTOMOTIVE ENGINE

BACKGROUND OF THE INVENTION

The present invention relates to a system for detecting troubles of an intake system of an automotive engine.

A fuel injection system in which a basic fuel injection quantity is determined in accordance with pressure in an intake pipe and speed of the engine is used for automobiles. In such a system, if a trouble of the intake pipe, such as the coming out of a blind cap on the intake system at downstream of a throttle valve which is caused by backfire arises, the air is inducted in the intake pipe passing through a hole for the blind cap without passing the throttle valve. The pressure in the intake pipe rises with the inducted air. As a result, the fuel injection system operates to increase the basic fuel injection quantity in accordance with the high intake pipe pressure, which causes abnormal increase of the speed of the engine regardless of driver's intention.

Japanese Patent Application Laid-Open No. 58-214632 discloses a system for dissolving such a problem. The system stores reference data of intake pipe pressure determined by the opening degree of the throttle valve and the engine speed. Detected intake pipe pressure is compared with a stored pressure. If the detected pressure is higher than the stored pressure, the basic fuel injection quantity is fixed to a predetermined value, thereby preventing abnormal increase of the engine speed.

However, in an engine in which a bypass provided with an idle speed control valve (hereinafter called ISC valve) is provided around the throttle valve, the reference pressure dependent on the opening degree of the throttle valve and the engine speed does not coincide with the detected pressure because of air passing in the bypass. The system determines such a state as an abnormal state to fix the fuel injection quantity which is insufficient for the operating condition to reduce engine performance.

SUMMARY OF THE INVENTION

The object of the present invention is to provide a system which may dissolve the above described problems in the conventional fuel injection system In the system of the present invention, the opening degree of the throttle valve is corrected with the opening degree of the ISC valve and others, so that a proper reference pressure can be obtained.

According to the present invention, there is provided a system for detecting troubles of an intake system of an engine having a bypass around a throttle valve and at least one valve provided in the bypass, comprising a memory storing a plurality of reference pressures for pressures in an intake passage of the engine which are arranged to be derived in accordance with speed of the engine and opening degree of a throttle valve of the engine, a pressure sensor for detecting pressure in an intake passage of the engine, an engine speed detector for producing the speed of the engine, a throttle position sensor for detecting the opening degree of the throttle valve, detector means for detecting the opening degree of the valve in the bypass, correcting means for correcting the opening degree detected by the throttle position sensor with the opening degree detected by the detector means and for producing a corrected opening degree, means for deriving a reference pressure from the memory in accordance with the detected engine speed and the corrected opening degree, comparator means for comparing a pressure detected by the pressure sensor with a reference pressure derived from the memory and for producing an abnormality signal when the detected pressure is higher than the reference pressure.

The other objects and features of this invention will become understood from the following description with reference to the accompanying drawings.

DETAILED DESCRIPTION OF THE PREFERRED EMBODIMENT

Figure 1:
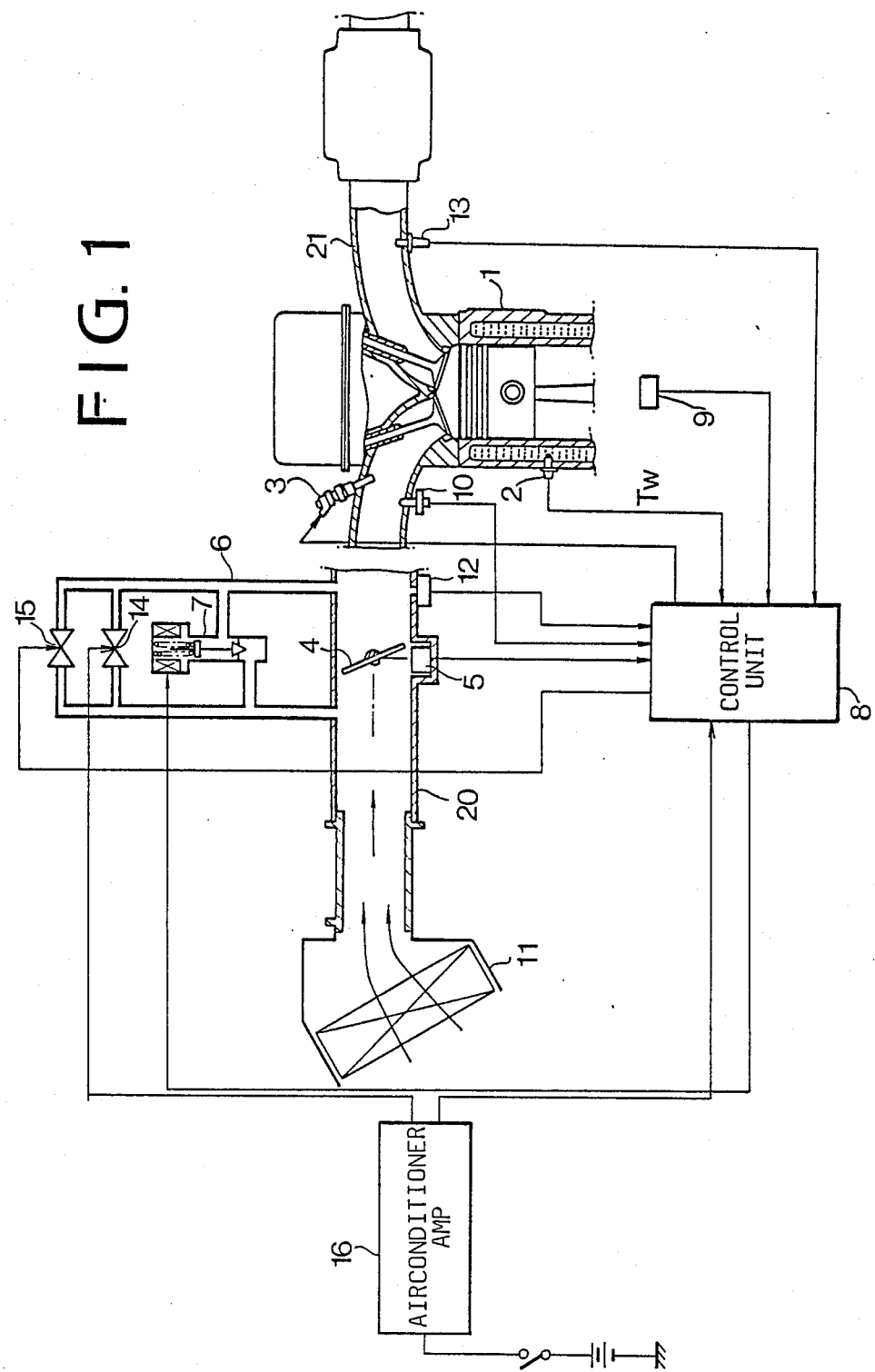
FIG. 1 is a schematic diagram showing a system according to the present invention.

Referring to FIG. 1, an automotive engine 1 is provided with a coolant temperature sensor 2 on a water jacket thereof, a fuel injector 3, and a throttle position sensor 5 for detecting the opening degree of a throttle valve 4 in an intake pipe 20. A bypass having three parallel passages is provided around the throttle valve 4. An idle speed control (ISC) valve 7, a fast idle control valve 14 operated by a signal from an air conditioner control amp 16, and an auxiliary valve 15 for cold engine are provided on the respective parallel passages. Further, there are provided a crankangle sensor 9 as an engine speed sensor, an air cleaner 11, intake air temperature sensor 10, pressure sensor 12 for detecting pressure in the intake pipe 20 at downstream of the throttle valve 4, and $O_2$-sensor 13 for detecting oxygen concentration of exhaust gas in an exhaust pipe 21. Output signals of those sensors and airconditioner amp 16 are fed to a control unit 8 which produces signals for operating the fuel injector 3, ISC valve 7 and auxiliary valve 15.

Figure 2:
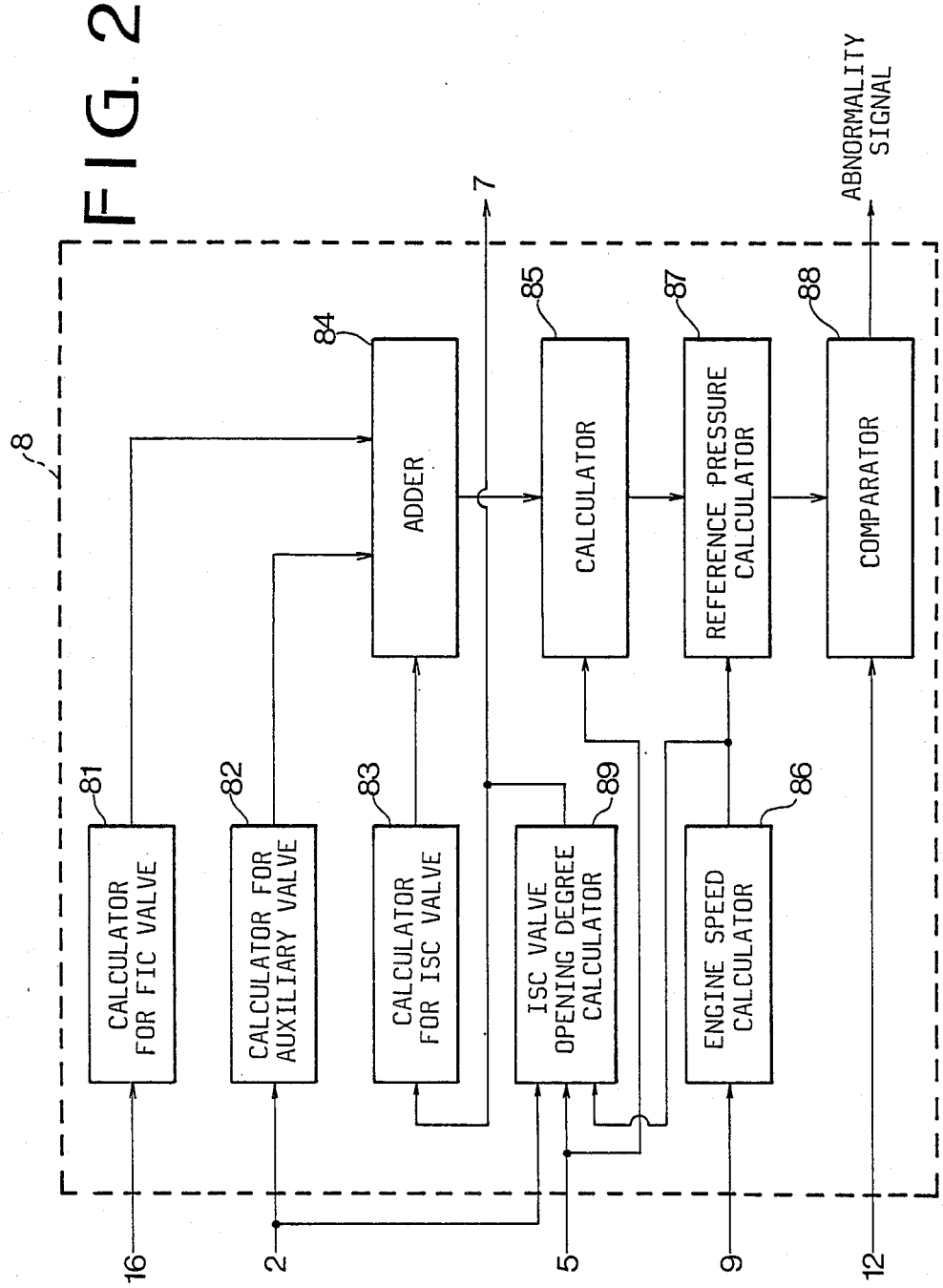
FIG. 2 is a block diagram of a control unit.

Referring to FIG. 2, an output signal of conditioner control amp 16 is fed to a calculator 81 for calculating area of the opening to be formed in fast idle control valve 14 (hereinafter called FIC valve). An output signal of the coolant temperature sensor 2 is supplied to an auxiliary valve opening area calculator 82. The calculator 82 has a table storing data for opening area for the auxiliary valve 15. A proper opening area is derived from the table in accordance with the detected coolant temperature or calculated by an interpolation calculation based on detected coolant temperatures. An engine speed calculator 86 is supplied with the output signal of the crankangle sensor 9 to produce an engine speed signal.

Output signals of coolant temperature sensor 2, throttle position sensor 5, and engine speed calculator 86 are fed to an ISC valve opening degree calculator 89. The output signal of the calculator 89 is applied to the ISC valve 7 to provide a proper opening degree. The output signal is also applied to an ISC valve opening area calculator 83 where the area of an opening to be formed is calculated.

Opening areas from calculators 81, 82 and 83 are applied to an adder 84 where these areas are added up to produce a bypass valve opening area SQ of the bypass 6. The opening area SQ and the throttle position THR from the throttle position sensor 5 are applied to a throttle opening degree correcting calculator 85. The calculator 85 has a table storing corrected throttle opening degrees in accordance with the throttle position THR and opening area SQ, and derives throttle opening degrees from the table. A corrected throttle opening degree CTHR=f(THR, SQ) is calculated with an interpolation calculation based on the derived throttle opening degrees.

Figure 4:
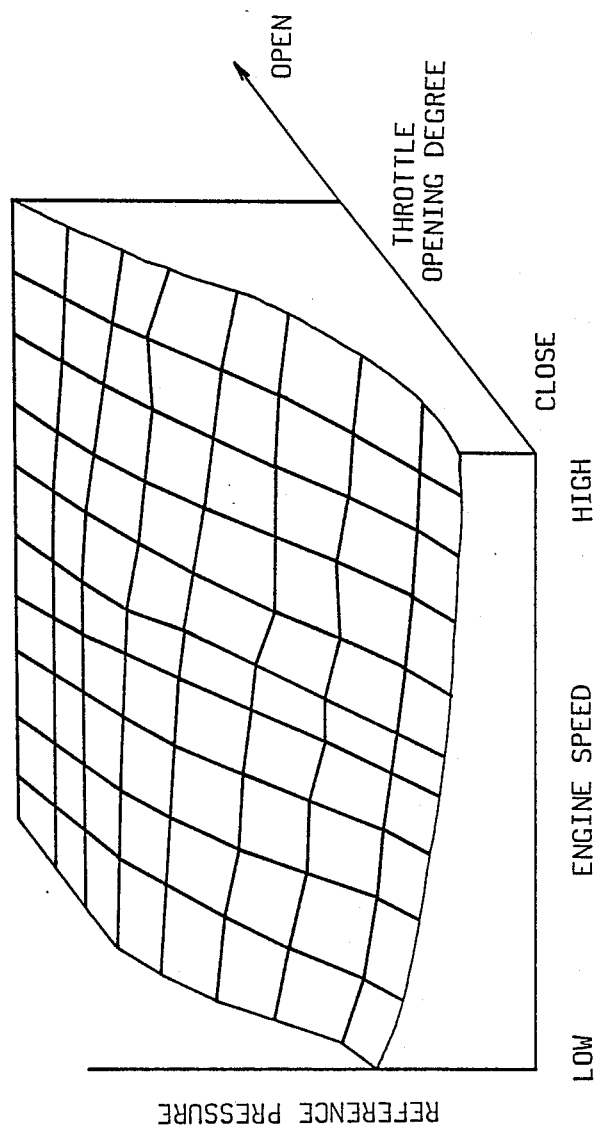
FIG. 4 is a perspective view schematically showing a three-dimentional table.

The output signal Ne of the engine speed calculator 86 and the corrected throttle opening degree CTHR are set to a reference pressure calculator 87. The calculator has a three-dimensional table storing reference intake pipe pressure in accordance with engine speed Ne and corrected throttle opening degree CTHR, as shown in FIG. 4. In accordance with the engine speed Ne and corrected throttle opening degree CTHR, reference pressures are derived from the table. Further, a reference pressure PMR for the pressure in the intake pipe 20 is calculated by an interpolation calculation based on the derived reference pressures PMR=f(Ne, CTHR). The actual pressure PM detected by the pressure sensor 12 is compared with the reference pressure PMR at a comparator 88. If the reference pressure PMR is higher than the pressure PM in the intake pipe, the intake system is in a normal state. If the pressure PM is higher than the reference pressure PMR, it is determined that any trouble arises in the intake system. The comparator produces a fail-safe signal to maintain a normal operation of the engine accordingly.

Figure 3:
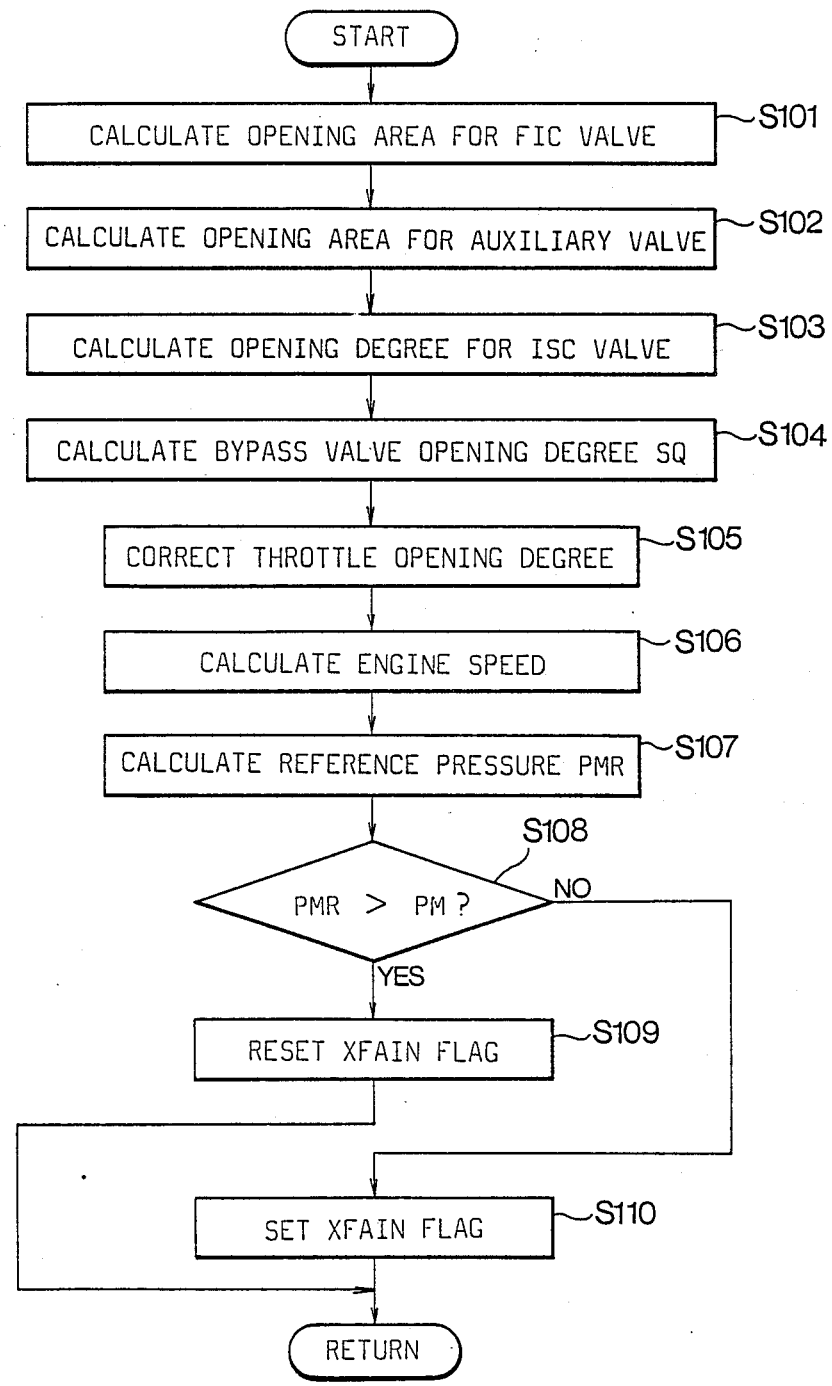
FIG. 3 is a flowchart of the operation of the control unit.

The operation of the system is described hereinafter with reference to FIG. 3. At a step S101, opening area for FIC valve 14 is calculated, and opening area for auxiliary valve 15 is calculated at step S102 dependent of the coolant temperature from the coolant temperature sensor 2. At a step S103, opening area for ISC valve 7 is calculated, and at a step S104, bypass valve opening area SQ is calculated. Further, corrected throttle opening degree CTHR, engine speed Ne, and reference pressure PMR are obtained at steps S105, S106 and S107, respectively. At a step S108, it is determined whether actual pressure PM is higher than the reference pressure PMR or not. If PMR>PM, the program proceeds to a step S109 where abnormal flag XFAIN is reset. If PMR<PM, abnormal flag XFAIN is set at a step S110, whereby a fail-safe signal such as fuel cut off signal is generated.

From the foregoing it will be understood that the present invention provides a system in which a corrected reference pressure is obtained, whereby abnormality in the intake system can be exactly detected.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for detecting troubles of an intake system of an engine having a bypass around a throttle valve and at least one valve provided in the bypass, comprising:
    storing means storing a plurality of reference pressures for pressures in an intake passage of the engine which are arranged to be derived in accordance with speed of the engine and opening degree of a throttle valve of the engine;
    a pressure sensor for detecting pressure in an intake passage of the engine;
    an engine speed detector for producing the speed of the engine;
    a throttle position sensor for detecting the opening degree of the throttle valve;
    detector means for detecting the opening degree of the valve in the bypass;
    correcting means for correcting the opening degree detected by the throttle position sensor with the opening degree detected by the detector means and for producing a corrected opening degree;
    means for deriving a reference pressure from the storing means in accordance with the detected engine speed and the corrected opening degree;
    comparator means for comparing a pressure detected by the pressure sensor with the reference pressure derived from the storing means and for producing an abnormality signal when the detected pressure is higher than the reference pressure.

2. The system according to claim 1 wherein the bypass has an idle speed control valve and a fast idle control valve.

* * * * *